Oct. 28, 1952
W. R. DRAY
2,615,294
ADJUSTABLE WHEEL MOUNT AND DRAFT GEAR
ARRANGEMENT FOR HARVESTER COMBINES
Filed July 10, 1948
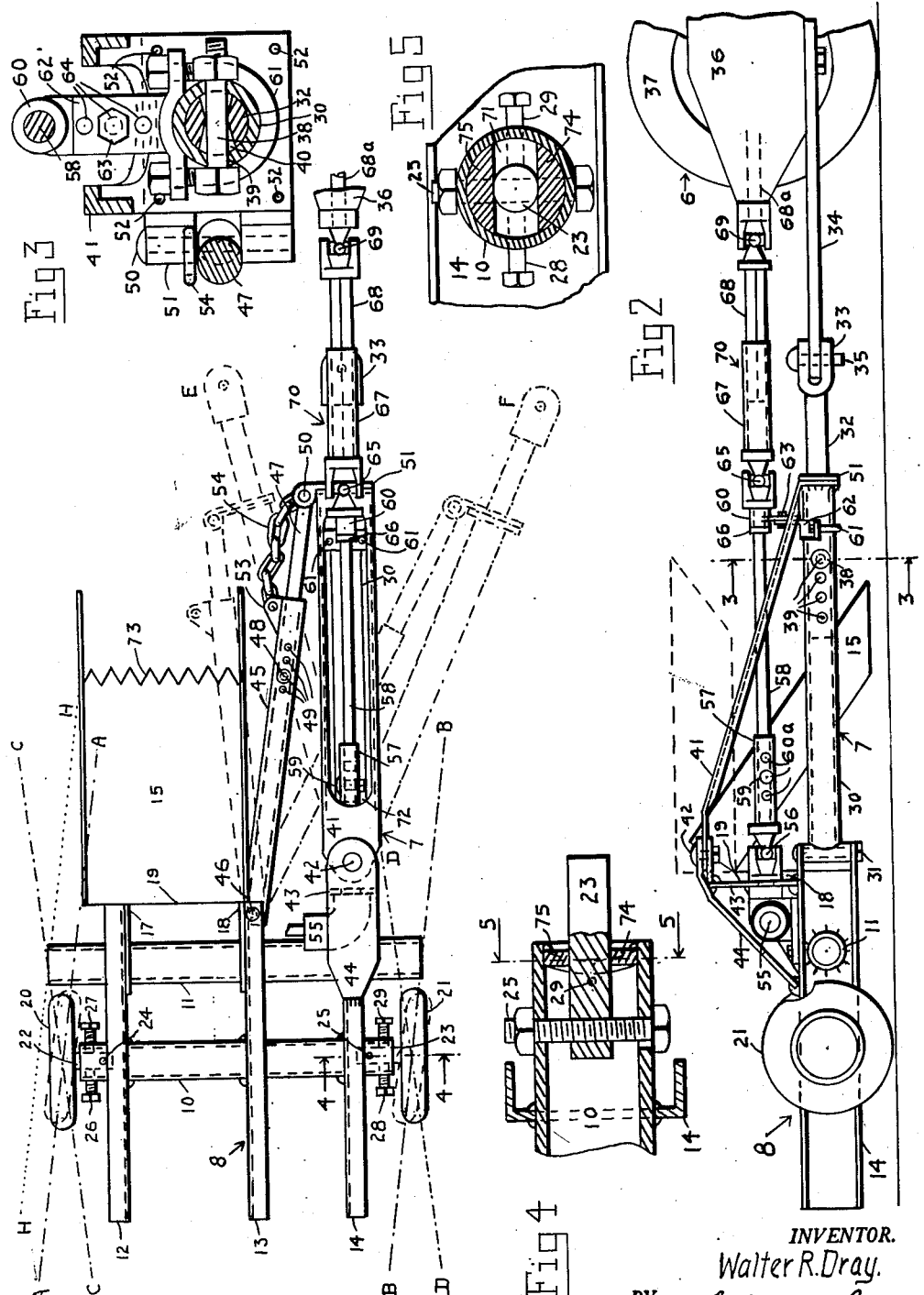
INVENTOR.
Walter R. Dray.
BY
John D Cox
Atty.

Patented Oct. 28, 1952

2,615,294

UNITED STATES PATENT OFFICE 2,615,294

ADJUSTABLE WHEEL MOUNT AND DRAFT GEAR ARRANGEMENT FOR HARVESTER COMBINES

Walter R. Dray, Yorkville, Ill.

Application July 10, 1948, Serial No. 38,026

6 Claims. (Cl. 56—218)

1

This invention relates to harvester combines and more particularly to the wheel mount and the draft gear and power shaft mechanism between the harvester combine and tractor operating apparatus.

One of the objects of the invention is the provision of new and improved draft gear mechanism and power shaft arrangement between the harvester combine and the tractor mechanism whereby the draft gear mechanism may be adjusted to change the combine relation to the line of draft without changing the operative position of the rear portion of the power shaft relative to the main draw bar or tongue of the combine.

Another object of the invention is the provision of new and improved cooperating means associated with both the wheels and draft bar of the combine for changing the line of draft relative to the combine as occasion or conditions may require.

Other and further objects and advantages of the invention will appear from the following description taken in connection with the accompanying drawings in which:

Fig. 1 is a plan view of a harvester combine shown more or less diagrammatically and with the thresher mechanism omitted for the sake of clearness;

Fig. 2 is a side elevation of Fig. 1 showing the draft gear hitched behind a tractor, shown more or less diagrammatically, and with the combine header shown in lower cutting position in full lines and in elevated position in dotted lines;

Fig. 3 is an enlarged view taken on line 3—3 of Fig. 2;

Fig. 4 is an enlarged view taken on line 4—4 of Fig. 1; and

Fig. 5 is a section on line 5—5 of Fig. 4.

Referring now to the drawing the reference character 8 designates a harvester combine with thresher mechansim omitted for the sake of clearness, which is adapted to be drawn by a suitable tractor 6 through the draft gear mechanism 7, as shown more particularly in Figs. 1 and 2.

The harvester combine 8 includes a main frame or running gear comprising tubular members 10 and 11 extending transversely to the combine, a central channel frame member 13, and side channel frame members 12 and 14 extending longitudinally thereof and welded to said tubular members. As shown, the tubular members 10 and 11 extend transversely through the webs of the channel members 12, 13 and 14 and are welded thereto as indicated in Figs. 2 and 4. This arrangement results in an extremely rigid frame construction for supporting the header and thresher mechanism.

The header mechanism 15 is shown diagrammatically in Figs. 1 and 2, in full lines when cutting low and in dotted lines when elevated, Fig. 2. This header is supported from two brackets 17 and 18 on the front ends of the longitudinal frame channel members 12 and 13 and is pivoted to swing in a vertical plane about the horizontal line 19, Figs. 1 and 2.

The combine is mounted for transportation on two wheels 20 and 21 which are rotatably mounted on stub-axles 22 and 23, adjustably connected to the ends of the tubular member 10, which may be considered the main axle member of the combine. These stub-axles are pivotally attached to the axle member by the threaded bolts 24 and 25 that extend vertically through alined endwise or longitudinal openings in the end walls of the tubular axle member 10 and the stub-axles 22 and 23, Fig. 4. The openings through the stub-axles are threaded. These stub-axles each extend outwardly through horizontal arcuate slots 71 formed by curved guide blocks 74 and 75 secured in each end of the tubular member 10, Fig. 4, as by welding. These stub-axles are held in adjusted position by opposing set screws 26, 27, and 28, 29 extending through the sides of the end walls of the tubular member 10 outwardly of the pivots 24 and 25. It will thus be seen that by loosening the set screws 27 and 28 and tightening the set screws 26 and 29 the wheels will take the positions to travel along the dotted lines A—A and B—B, which may be parallel with the standing grain shown by the dotted line H—H. On reversing the adjustments the wheels will travel along the dotted lines C—C and D—D, thus modifying the line of movements of the combine 8 with its header 15 and sickle 73.

The draft gear mechanism 7 is provided for drawing the combine and may be adjusted laterally for modifying the position of the combine relative to the line of draft. This draft gear mechanism comprises a tongue or tongue member 30, an upper tension member 41, and a lateral tongue securing or tension member 45. In the form of the device selected to illustrate one embodiment of the invention the tongue 30 pivoted at its rear end to the front end of the right longitudinal channel bar frame member 14 by a vertical pivot 31, is provided. The tongue 30 is preferably tubular in order to resist bending and torsion and has a front extension 32 telescoped therein. The front end of this extension is provided with a clevis or is bifurcated as at 33 for connection to the draw bar 34 of the tractor 6 by a hitch pin 35. The tractor draw bar 34 is connected to the rear axle housing 36 of the tractor, as shown diagrammatically at 36. The left rear wheel of the tractor is shown at 37.

The telescopic extension 32 of the tongue is adjustable for adjusting the over-all length of tongue to match up with different tractors with different distances between their power take-offs and hitch pins without requiring extra special auxiliary parts. There is another important advantage in providing a telescopic tongue extension, for the tractor and combine will make shorter turns if the distance between the rear wheels of the tractor and hitch pin is longer than usual, or the standard that has recently been set by the American Society of Automotive Engineers. This "longer hitch" gives a sort of "jack knife" action as the turns are made, so that there is less time lost. Of course, for this longer distance on the tractor, which is easily provided by extending the draw bar, there must be a corresponding matching distance in the combine which may be provided by the adjustable tongue extension 32. The tongue extension 32 is held in adjusted position by a pin 38 that extends through any one of a series of holes 39 in the tongue 30 and an alined hole 40 through the extension 32, Fig. 3. The hole 40 is tapered inwardly from each end thereof, which permits a partial rotation of the extension relative to the tongue for accommodating relative rocking or twisting movement of the tractor and combine.

The upper brace member 41 is pivoted at its rear end by the vertical pivot 42 to the upper horizontal ends of upstanding bracket members 43 and 44. These bracket members are welded together at their upper ends, and spaced apart at their lower ends and are rigidly connected to the longitudinal frame member 14 as by welding. The forward end of this upper brace 41 is rigidly connected to the forward end of the tongue 30 at 51 as by welding or the like. This upper brace member 41 is a channel bar member having an oblong slot 72 extending in a vertical plane through its central portion and through which the combine propeller or power shaft extends, as will presently appear.

The tongue and upper brace member with their pivots 31 and 42 are in vertical alinement so that these members may be swung either to the left or to the right as a unit, as shown at E and F in dotted lines in Fig. 1.

Suitable means are provided for securing the tongue in lateral adjusted positions. In the form shown, this securing means comprises a telescopic tension member having a rear tubular section 45 and a forward section 47 telescoped therein. The section 45 is pivoted as at 46 to the forward end of the middle longitudinal frame member 13 to swing about a vertical pivot in the horizontal plane of the tongue 30. The forward section 47 is pivotally connected as at 50 to a plate 51 rigidly connected to the forward end of the upper brace member 41 as by rivets 52 of the like, Fig. 3. The sections 45 and 47 of the tension member are secured in adjusted position by a pin 48 that engages any one of a series of openings 49 in the section 45 that may register with an opening through the forward section 47. A flexible tie member such as a limiting chain 53 secured at one end to the pin 50 and at its other end to a bracket 53 may be provided for preventing disengagement of the two sections 45 and 47 of the telescopic tension member while adjusting the draft mechanism.

It will thus be seen that when the header 15 is elevated as shown in dotted lines in Fig. 2 and the pin 48 removed, the tongue 30 and its extension 32 may be moved to the dotted line position E shown in Fig. 1 with the tension member 45, 47 beneath the header so that the combine will be more nearly directly behind the tractor for more convenient transportation, especially along the highways.

By adjusting the tension member 45, 47, by lengthening or shortening the same, more or less side draft is transferred to the wheels 20 and 21 but by adjusting the stub-axles so that the plane of the wheels will be more nearly parallel with the line of draft, this side draft on the wheels may be remedied. Furthermore, it is not uncommon for the field of crop material to have ridged rows from cultivation from the previous crop. It is desirable that the header be spaced evenly across these rows or perhaps just slightly unevenly to favor one side or the other, as may be desired by the operator. This being decided upon by the operator, there next comes the problem of adjusting the wheels of the combine so that not only will the wheel on the left or grain side particularly not run on top of a row ridge, but may perhaps just hug one side of the ridge so as to make the combine follow the rows with less deviation from the best line. As shown by Fig. 1, adjustment of the wheels has the effect of changing their sidewise relationship to the cutting path of the header sickle, by twisting the whole combine sideways relative to the direction of travel.

However, and this is quite important, this twisting results also in moving sideways the position of the tractor, relative to the path of the sickle cut. There is thus needed some corrective side adjustment of the tractor, and this is accomplished by adjusting the length of the left hand tension member, so as to move the hitch pin sideways. There are two reasons for this: one to have the tractor's left hand or grain wheel run as close to the uncut grain as is practical, so as to have as little combine side draft as possible for the particular overall width of the tractor; and the other to keep the tractor wheels off of the ridges of row crops.

Means are provided for transferring power from the tractor through the sectional power shaft 70 to the gear box 55 of the combine mechanism for operating the same.

The gear box 55 for the combine mechanism is mounted on the main frame of the combine and has a universal joint 56 in the vertical axis of the pivots 31 and 42 to accommodate the swinging of the tongue. The rear section 57 of the propeller or power shaft 70 is rigidly connected to one member of the universal joint 56 of the gear box 55 and its opposite tubular end telescopically receives the rear end of the next adjacent section 58 of the power shaft 70. The sections 57 and 58 are held in adjusted position by a pin 59 extending through one of a series of holes 60a in the section 57 and an alined hole in the rear end of the section 58 so that the combined length of the sections 57 and 58 may be varied as desired or as occasion may require.

The shaft sections 57 and 58 extend along the tongue 30 and in the vertical plane thereof and is connected at its forward end to a universal joint 65. The forward end of the shaft section 58 and universal joint 65 is supported from the tongue 30 by an adjustable bracket 62 which may be adjusted longitudinally of the tongue 30 or transversely thereto and which has a bearing 60 at its upper end, in which the forward end of shaft section 58 is journaled. This bearing 60 is confined between a collar 66 and the universal joint 65. The bracket 62 is clamped to the forward end of the tubular tongue 30 by a U-bolt 61 extending through the base of the bracket 62. When this U-bolt is unclamped the bracket 62 may be slid along the tongue or moved transversely thereto or partially turned thereon for properly positioning the shaft 58 above the tongue. This bracket is extensible vertically. It is in two overlapping sections, the upper one being integral with the bearing 60 and the lower section being integral with the base of the bracket. The overlapping sections are clamped together by the bolt 63, which engages one of a series of openings 64 in one of the bracket members and an alined opening in the other bracket member. This collar 66 may be omitted, if desired, to permit longitudinal adjustment of the bearing 60.

The forward portion of the power shaft comprises the telescopic sections 67 and 68. The section 67 is connected to one end of the universal joint 65 and has an axial opening in its forward end angular in cross section in which it slidably receives the rear angular end of the section 68. The front end of the section 68 receives power from the tractor take-off shaft 68a through the universal joint 69. The parts are so adjusted and constructed that the hitch pin 35 is normally vertically below the halfway point between the universal joints 65 and 69 in order to prevent objectionable pounding of the shaft in making very short turns. In making these short turns, the tendency is to bend or twist the tongue, and in order to resist this torque or bending action, the tongue is made tubular, which will give maximum resistance.

One of the vertical openings through each end of the tubular member 10, such as the lower one, is in the form of a slot extending longitudinally of the member so that the bolts can be inclined, thereby inclining the stub axles or cambering the axle, so that the upper portions of the wheels may be inclined away from the combine frame. By means of this arrangement, greater clearances for mud and debris are provided between the upper portions of the wheels and the frame. This is important, especially in harvesting grain on wet, muddy ground. Sufficient clearances are provided in the arcuate slots 71 for permitting this slight tilting of the stub axles. The slots 71 may be tapered similar to the opening 40 of Fig. 3, if desired.

It is thought from the foregoing, taken in connection with the accompanying drawings, that the disclosure of my invention will be apparent to those skilled in the art, and that changes in the size, shape, proportions and details of the various parts may be made without departing from the spirit and scope of the appended claims.

I claim as my invention:

1. In combination, a harvester including a frame having a harvester implement mounted thereon, a transversely extending supporting axle member attached to the frame, dirigible wheels mounted on the end portions of the axle member, a draft tongue pivotally connected to the frame for rotation about a substantially vertical pivot axis, and means operatively connected to the tongue and frame for adjusting the angularity of the tongue with respect to the longitudinal axis of the frame whereby when the tongue thus angularly positioned is attached to a tractor for towing the frame in laterally offset relation to the path of the tractor the wheels may be adjusted to effect accurate desired tracking of the frame parallel to the tractor path.

2. In combination, a harvester including a frame having a harvester implement mounted thereon, a transversely extending supporting axle member attached to the frame, stub axles pivotally connected to the end portions of the axle member for limited rotation about substantially vertical pivot axes, a dirigible wheel mounted on each stub axle, thrust means mounted in the axle member bearing laterally against the stub axles and adjustable to set the planes of the wheels obliquely to the longitudinal axis of the axle member, a draft tongue pivotally connected to the frame for rotation about a substantially vertical pivot axis, and means operatively connected to the tongue and frame for adjusting the angularity of the tongue with respect to the longitudinal axis of the frame whereby when the tongue is attached to a tractor for towing the frame in laterally offset relation to the path of the tractor the stub axles may be adjusted to effect accurate desired tracking of the frame parallel to the tractor path.

3. The combination claimed in claim 2, in which the axle member is provided with endwise openings and the stub axles extend into said openings and in which the thrust means are screws threaded diametrically oppositely into said endwise openings.

4. The combination claimed in claim 2, in which the stub axles extend into endwise openings in the end portions of the axle member and in which the thrust means are bolts screw threaded diametrically oppositely into said endwise openings and provided with headed projecting ends adapted to receive an adjusting tool.

5. The combination claimed in claim 1, in which the frame includes longitudinally extending side frame members and in which the tongue is pivotally connected to one of said members.

6. The combination claimed in claim 5, including drive transmission means for the harvester implement comprising a drive shaft extending parallel to the draft tongue and in the same vertical plane as the tongue and a universal joint in the vertical line of the draft tongue pivot axis.

WALTER R. DRAY.

REFERENCES CITED

The following references are of record in the file of this patent:

UNITED STATES PATENTS

| Number | Name | Date |
| --- | --- | --- |
| 181,647 | De Valin | Aug. 29, 1876 |
| 903,708 | Groth | Nov. 10, 1908 |
| 904,296 | Bashford | Nov. 17, 1908 |
| 958,350 | Anderson | May 17, 1910 |
| 1,049,082 | Hanselman | Dec. 31, 1912 |
| 1,178,857 | Kirner | Apr. 11, 1916 |
| 1,436,595 | McKay | Nov. 21, 1922 |
| 1,764,971 | Nilson | June 17, 1930 |
| 2,226,563 | Keith | Dec. 31, 1940 |
| 2,281,059 | Anderson et al. | Apr. 28, 1942 |
| 2,316,397 | Briscoe | Apr. 13, 1943 |
| 2,429,492 | Scranton | Oct. 21, 1947 |
| 2,494,080 | Andrews et al. | Jan. 10, 1950 |